United States Patent
Kurtz

[15] 3,680,822
[45] Aug. 1, 1972

[54] FLOOR TO CEILING WALL MIRROR FASTENING CLIP

[72] Inventor: Thomas D. Kurtz, Rock Falls, Ill.

[73] Assignee: Kurtz Enterprises, Inc., Rock Falls, Ill.

[22] Filed: May 15, 1970

[21] Appl. No.: 37,655

[52] U.S. Cl. .................248/475, 85/8.6, 248/316 R
[51] Int. Cl. .............................................A47g 1/16
[58] Field of Search..248/475, 479, 484, 488, 316 R, 248/316 A, 361 B; 24/248 SW, 248 W, 248 A, 248 B; 40/152.1, 125 F; 85/8.6; 160/10

[56] References Cited

UNITED STATES PATENTS

| | | | |
|---|---|---|---|
| 2,577,526 | 12/1951 | Kelly | 248/478 X |
| 1,966,505 | 7/1934 | Keefe | 248/475 R |
| 3,377,042 | 4/1968 | Breeding et al. | 248/488 X |

FOREIGN PATENTS OR APPLICATIONS

| | | | |
|---|---|---|---|
| 1,351,215 | 12/1963 | France | 248/488 |

*Primary Examiner*—J. Franklin Foss
*Attorney*—Andrew F. Wintercorn

[57] ABSTRACT

In this floor to ceiling wall mirror fastening the removable mirror retaining part has a horizontal elongated flange portion adapted to be entered in an elongated horizontal sleeve portion that extends outwardly from the edge of the attaching plate fastened to the wall, and a lug projecting from one end of the aforesaid flange has pivotal connection with one end of the sleeve in a slot provided therein, the other end of the flange having integral therewith a generally C-shaped spring catch in the horizontal plane thereof which can be pressed home in the sleeve for snap-in engagement of a projection on this catch in a keeper slot provided in that end of the sleeve, the projection being cammed out of the way until the projection arrives adjacent the slot when it snaps into place therein. A portion of the spring catch is exposed at the end of the sleeve so that a pin or the like can be used in depressing the spring catch enough to release it, and there is sufficient deflection of the mirror retaining part outwardly as the part is pressed home in fastening the mirror, so that this part springs outwardly as soon as the catch is released.

15 Claims, 11 Drawing Figures

PATENTED AUG 1 1972
3,680,822
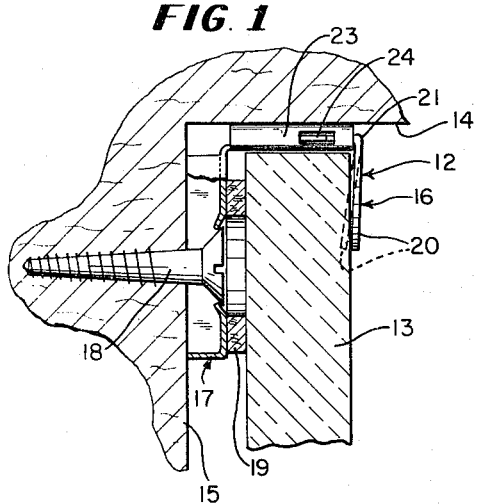
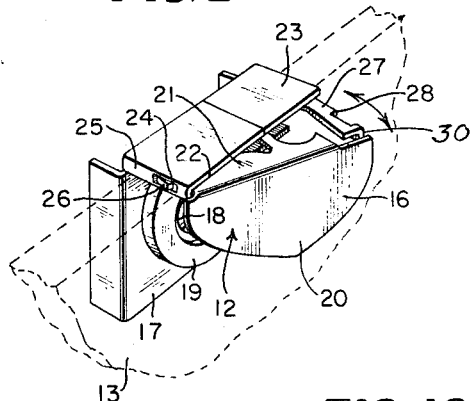
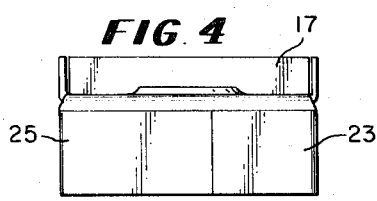
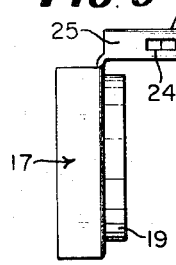
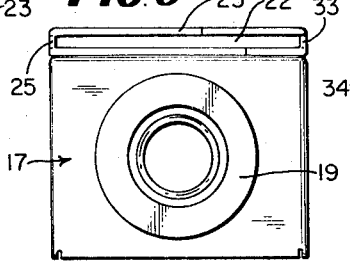
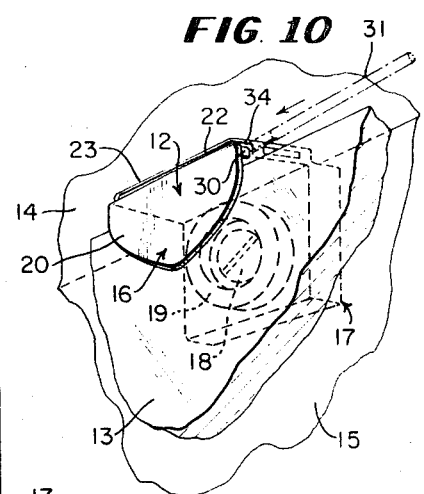
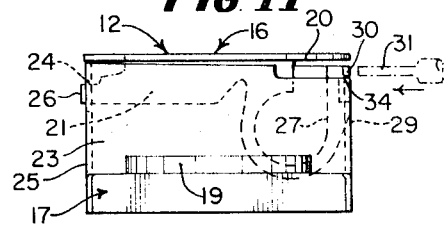
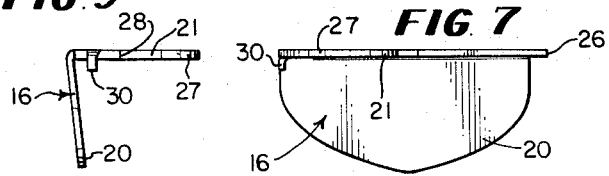
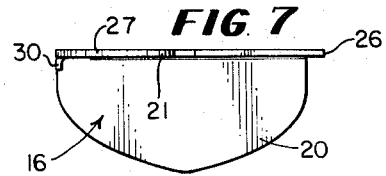
INVENTOR:
THOMAS D. KURTZ
ATTORNEY

3,680,822

FLOOR TO CEILING WALL MIRROR FASTENING CLIP

This invention relates to novel snap-in type mirror clips especially designed for use in fastening the upper edges of floor to ceiling wall mirrors, the present design permitting application to and removal from the upper edge of the mirror in a substantially horizontal plane so that a minimum amount of space is required between the upper edge of the mirror and the ceiling, whereas all mirror clips previously available either required ample free-board space above the mirror for application or removal of the clips or limited their application to the side edges of the mirror.

More specifically stated, the removable mirror retaining part of the present mirror clip has a horizontal elongated flange portion adapted to be entered in an elongated horizontal generally rectangular flat sleeve portion that extends forwardly from the upper edge of the fixed attaching plate that is fastened to the wall next to the ceiling, this sleeve portion having a slot in one end wall in which there is engaged a lug projecting horizontally from one end of the aforesaid flange for pivotal connection of the flange with the sleeve so that the other end of the flange, on which a generally C-shaped spring catch is defined in the horizontal plane of the flange can be pressed home in the sleeve for snap-in engagement of a projection on the free end of the C-shaped portion in a keeper slot provided in that end of the aforesaid sleeve, the outer edge of the C-shaped catch portion being cam shaped and arranged to slide smoothly on the end wall of the sleeve to deflect the free end portion of the catch and guide the projection into the slot so it snaps into place, therein, the last mentioned slotted end portion being cut away on its outer side near the slot so that a pin or the like can be entered at that point behind the downwardly projecting mirror retaining flange portion of the clip to depress the free end of the spring catch enough to release it whenever it is desired to remove the mirror, as, for example, when it requires resurfacing of the mirror coating on the back, or in the event of breakage.

The invention is illustrated in the accompanying drawing, in which:

FIG. 1 is a vertical section of a wall and ceiling showing one of my improved mirror clips installed and showing the upper edge portion of a floor to ceiling mirror fastened in place thereby, it being understood, however, that the same form of clips can be used also at the bottom edge at floor level, if desired, and at the side edges also, although other conventional forms of fastening as mounting clips are already available suitable for those locations;

FIG. 2 is a perspective view of the mirror clip showing the method of assembly and disassembly by pivotal movement of the removable mirror retaining part of the clip relative to the fixed attaching part in a horizontal plane relative to the top sleeve portion thereof;

FIGS. 3 to 6 are respectively a front view, top view, and end views taken from the left and right ends of the fixed attaching plate;

FIGS. 7, 8 and 9 are three views of the removable retaining part of the clip, FIG. 7 being a rear view, FIG. 8 a top view of FIG. 7, and FIG. 9 an end view looking at the left end of FIG. 7, and FIGS. 10 and 11 are views illustrating the method of releasing the spring catch on the removable mirror retaining part of the clip.

The same reference numerals are applied to corresponding parts throughout the views.

Referring to the drawing, the reference numeral 12 designates the mirror clip of my invention generally, designed for use in the small space left between the upper edge of a floor to ceiling wall mirror 13 and the ceiling 14, each of the clips 12 used for fastening the upper edge of the mirror to the wall 15 consisting of the removable mirror retaining part 16 and the fixed attaching plate 17 that is adapted to be fastened to the wall in any suitable manner, as, for example, by means of a screw 18. A washer 19 of cork or other suitable cushioning material is cemented to the attaching plate 17 to bear against the back of the mirror behind the edge portion of the mirror that is engaged by the resilient retaining flange 20 on the removable mirror retaining part 16 of the clip.

The attaching plate 17 is formed from sheet metal whereas the retaining part 16 of the clip is of spring steel construction and generally L-shaped cross-section and has an attaching flange 21 integral with and in right-angle relationship to the retaining flange 20 and adapted to be entered with a close working fit in the opening 22 provided in the elongated horizontal, generally rectangular, flat sleeve portion 23 that extends forwardly from and is integral with the upper edge of the fixed attaching plate 17. This sleeve portion 23 is disposed close to if not in abutment with the ceiling 14 when the mirror clip is installed as seen in FIGS. 1 and 10. A keeper defining slot 24 is provided in one end wall 25 of this sleeve portion, and a keeper engaging 26 projecting horizontally from one end of the attaching flange 21 engages in this slot for pivotal connection of the flange with the sleeve 23, so that the other end of the flange, on which a generally C-shaped spring catch 27 is defined in the horitontal plane of the flange 21, can be pressed home in the sleeve 23 for snap-in engagement of a projection 28 on the free end of the C-shaped portion 27 in a keeper slot 29 that is provided in that end of the aforesaid sleeve 23, to lock the removable mirror retaining part 16 in place and thus hold the upper edge of the mirror 13. The retaining flange 20 is normally inclined inwardly as indicated in dotted lines in FIG. 1 but in the final movement of the retaining part 16 of the clip into holding position is flexed outwardly to the small extent indicated in full lines in FIG. 1, so that the upper edge portion of the mirror will be held in place resiliently, and so that this spring action of flange 20 will also be useful later in causing the part 16 of the clip to spring outwardly whenever the spring catch 27 is released, as by depressing the end portion 30 by means of a pin 31, or other tool, enough to release the aforementioned projection 28 from the slot 29. The end portion 30 of the catch 27 is bent downwardly as best appears in FIGS. 7 and 9 so that the operator will not find it too difficult to bring the pin 31 or other tool into engagement with this end in releasing the catch. The outer edge 32 of the C-shaped catch portion 27 is cam-shaped and arranged to slide smoothly on the end wall 33 of the sleeve 23 to deflect the free end portion 27 of the catch inwardly and guide the projection 28 into the slot 29 so it snaps into place therein as the C-shaped catch portion 27 springs outwardly as soon as the projection 28 reaches the slot 29. The outer end of the wall 33 is cut away, as at 34, near the slot 29, so that the downwardly bent end portion 30 on the free end of the C-shaped catch portion 27 is more easily accessible when the pin 31 or other tool is to be entered at that point behind the downwardly projecting mirror retaining flange 20 for release of the catch. The springing inwardly of the flange 20 on the mirror retaining part 16 the instant the catch 27 is released accounts for this part being propelled outwardly when the catch 27 is released and that is a big help to the operator, as there is, therefore, no uncertainty about when this operation has been completed.

In operation, it will be understood that one or two of the present mirror clips would usually be sufficient to fasten the upper end portion of a floor to ceiling mirror next to the ceiling 14. While clips of the present type could, of course, be used also at the floor level, or for that matter at any other edge portion of the mirror and on either side, mirror clips previously available will usually be used, being obtainable at a lower cost, being of simpler and cheaper construction.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. A device for supporting an object such as a mirror and the like comprising a first substantially vertical flat member adapted to be secured to a support and having an outwardly projecting generally flat substantially horizontal sleeve portion, a second generally flat substantially vertical member for retaining the object between it and the first member having an inwardly projecting substantially horizontal flange portion adapted to be entered in the aforesaid sleeve, said sleeve having an opening provided in each end defining a keeper, said flange being elongated and of substantially the same length as said sleeve and having a projection on one end for pivotal engagement with the keeper in one end of said sleeve, and catch means on the other end of said flange detachably engageable with the keeper in the other end of said sleeve, whereby to detachably secure an edge portion of a mirror and the like between the first and second members.

2. A device as set forth in claim 1, wherein the second member is of resilient material and is normally disposed in inwardly angled relationship to said first member but adapted to be sprung outwardly into substantially parallel relationship thereto, whereby to hold the object between said members under spring tension when the second member is assembled on the sleeve portion of the first member.

3. A device for supporting an object such as a mirror and the like comprising a first generally flat member adapted to be secured to a support and having an outwardly projecting generally flat sleeve portion, a second generally flat member for retaining the object between it and the first member having an inwardly projecting flange portion adapted to be entered in the aforesaid sleeve, said sleeve having opposed end walls with an opening provided in each, said flange being elongated and of substantially the same length as said sleeve and having a projection on one end for pivotal engagement in the opening in one end wall of said sleeve, and catch means on the other end of said flange detachably engageable in the opening in the other end wall of said sleeve, whereby to detachably secure an edge portion of a mirror and the like between the first and second members, the catch on one end of the flange on the second member being a generally C-shaped spring catch formed integral with one end of the flange in substantially coplanar relationship thereto and having a projection on the free end portion thereof engageable with spring action in the opening in the adjacent end wall of the sleeve portion on the first member.

4. A device as set forth in claim 3, in which there is outwardly with respect to said last mentioned projection a portion of said spring catch accessible at the same end of said sleeve portion adapted to be depressed inwardly to release said catch.

5. A device as set forth in claim 3, in which the object retaining portion of the second member is normally angled inwardly relative to the first member but sprung outwardly when the second member is assembled in the sleeve portion of said first member, whereby the second member upon release of said catch tends to spring away from the sleeve portion of said first member upon release of the spring catch.

6. A device as set forth in claim 3, in which a portion of the last mentioned end wall of the sleeve portion is cut away at the outer end to expose the outer end of the spring catch for easier depression thereof and release of the catch.

7. A device as set forth in claim 3, in which the object retaining portion of the second member is normally angled inwardly relative to the first member but sprung outwardly when the second member is assembled in the sleeve portion of said first member, whereby the second member upon release of said catch tends to spring away from the sleeve portion of said first member upon release of the spring catch, a portion of the last mentioned end wall of the sleeve portion being cut away at the outer end to expose the outer end of the spring catch for easier depression thereof and release of the catch.

8. A device as set forth in claim 3, in which the C-shaped catch has a cam surface on its outer edge which by slidable engagement with the last named end wall on the sleeve in assembling the device keeps the projection clear the ed wall so it will snap into place when it arrives at said opening.

9. A device for supporting the upper edge portion of a mirror and the line on a wall and in closely spaced relationship to a ceiling comprising a substantially vertical attaching member secured to the wall and having a flat sleeve portion in substantially right-angled horizontal relationship thereto disposed in close parallel relationship to the ceiling, a substantially vertical retaining member for the mirror and the like disposed in substantially parallel relationship to the attaching member and having a flange extending substantially horizontal inwardly therefrom entered in said sleeve portion, and means for detachably securing the opposite ends of said flange to the opposite ends of said sleeve.

10. A device as set forth in claim 9 in which the last mentioned means comprises an opening provided in each end of said sleeve, a projection on one end of said flange for pivotal engagement in the opening in one end of said sleeve, and catch means on the other end of said flange detachably engageable in the opening in the other end of said sleeve, whereby to detachably secure an edge portion of a mirror and the like between the first and second members.

11. A device as set forth in claim 9, wherein the second member is of resilient material and is normally disposed in inwardly angled relationship to said first member but adapted to be sprung outwardly into substantially parallel relationship thereto, whereby to hold the object between said members under spring tension when the second member is assembled on the sleeve portion of the first member.

12. A device as set forth in claim 9, wherein the last mentioned means includes a spring action catch on at least one end of said flange engageable in an opening provided in that end of the sleeve when the flange is pressed home in the sleeve.

13. A device as set forth in claim 9, wherein the last mentioned means includes a spring action catch on at least one end of said flange engageable in an opening provided in that end of the sleeve when the flange is pressed home in the sleeve, the second member being of resilient material and normally disposed in inwardly angled relationship to said first member but adapted to be sprung outwardly into substantially parallel relationship thereto, whereby to hold the object between said members under spring tension when the second member is assembled on the sleeve portion of the first member.

14. A device for supporting an edge portion of a mirror and the like on a wall comprising a substantially vertical attaching member secured to the wall and having a flat substantially horizontal sleeve portion in substantially right-angled relationship thereto, a substantially vertical retaining member for the mirror and the like disposed in substantially parallel relationship to the attaching member and having a substantially horizontal flange extending inwardly therefrom entered in said sleeve portion, and spring catch means for detachably securing said flange in said sleeve.

15. A device as set forth in claim 14, wherein the second member is of resilient material and is normally disposed in inwardly angled relationship to said first member but adapted to be sprung outwardly into substantially parallel relationship thereto, whereby to hold the object between said members under spring tension when the second member is assembled on the sleeve portion of the first member.

* * * * *